Sept. 17, 1963

R. M. VAUGHN 3,103,675

BROACHING METHOD AND APPARATUS FOR
FORMING AN UNDERCUT SLOT

Filed March 21, 1960

INVENTOR.
RUDOLPH M. VAUGHN
BY
Elliott & Pastoriza
ATTORNEYS

United States Patent Office 3,103,675
Patented Sept. 17, 1963

3,103,675
BROACHING METHOD AND APPARATUS FOR FORMING AN UNDERCUT SLOT
Rudolph M. Vaughn, 2008 N. Westwood, Santa Ana, Calif.
Filed Mar. 21, 1960, Ser. No. 17,733
4 Claims. (Cl. 10—6)

This invention relates generally to a novel broaching method and apparatus.

Broaching operations, as opposed to milling, result in the forming of a work by a cutting action rather than a chipping or impacting action. The finished work itself can thus be made to conform to the physical dimensions of the broaching tool, and for work involving extremely close tolerances, broaching is preferable to a milling or filing operation. The conventional broaching tools such as "rimmers" or "reamers" employed at present are usually reciprocated into a cavity of the work or even against a surface of the work itself to effect the desired forming.

The present invention has as its primary object the provision of a novel method and apparatus for broaching in which many types of work forming operations not heretofore subject to conventional broaching methods and tools can be carried out.

More specifically, an object of this invention is to provide a novel broaching method and apparatus for forming slots in screw heads to the end that manufacture of the screw heads can be achieved in less time and with greater accuracy than heretofore possible.

A particular object of this invention is to provide a novel broaching method and apparatus for forming high torque screw head slots having undercut non-planar surfaces as described and claimed in my United States Patent No. 2,677,985, issued May 11, 1954.

Briefly these and many other objects and advantages of this invention are attained by providing a broaching tool in the form of a wheel having broaching teeth in which a given dimension is successively increased about the periphery of the wheel over a circumferential extent less than 360 degrees to leave a segmented portion of the wheel free of the teeth. The varying dimension may constitute either or both the depth of the teeth in a radial direction or the width of the teeth at their peripheral portions. The wheel itself is mounted for rotation about an axis which is fixed relative to a work table or conveyor system so that the broaching operation may be carried out on a work positioned beneath the segmented portion of the wheel by effecting only a single rotation of the wheel itself. During this single wheel movement, the teeth successively penetrate and broach the work into the desired formation.

In accordance with the method of the invention, the various steps include the positioning of the work in a fixed relationship with respect to the axis of the broaching wheel; and the effecting of a single rotation of the wheel to form the desired structure into the work. Further steps of the method include providing additional broaching wheels at successive positions so that a plurality of respective operations may be carried out by moving a single work progressively into the successive positions.

A better understanding of both the method and apparatus of the invention will be had by referring to a preferred embodiment thereof in conjunction with the accompanying drawings, in which.

In accordance with the particular method to be described merely by way of example of the instant invention, a high torque undercut slot in a screwhead of the type described in my United States Patent No. 2,677,985 is formed. The geometry of the undercut non-planar sidewalls of this type of slot is fully set forth in said patent which is incorporated herein by reference. The presently known method for forming such high torque screw slots of which the instant invention is deemed an improvement is fully set forth in my United States Patent 2,745,120 wherein the slot formation is effected by a milling wheel rather than by a broaching procedure.

In accordance with the known method, a milling wheel provided with peripheral teeth having sides converging inwardly in an inward radial direction from the periphery is provided. This milling wheel is rotated about a horizontal axis and vertically lowered onto the screw head to cut an initial transverse slot across the top of the head. The milling wheel is then caused to rotate about a vertical axis co-incident with the vertical longitudinal axis of the screw blank itself to provide the desired undercuts.

In the broaching method and apparatus of the present invention, a screw slot of identical interior geometry is provided without the necessity of raising or lowering the working tool and also without the necessity of swivelling the tool about a vertical axis.

Figure 1:
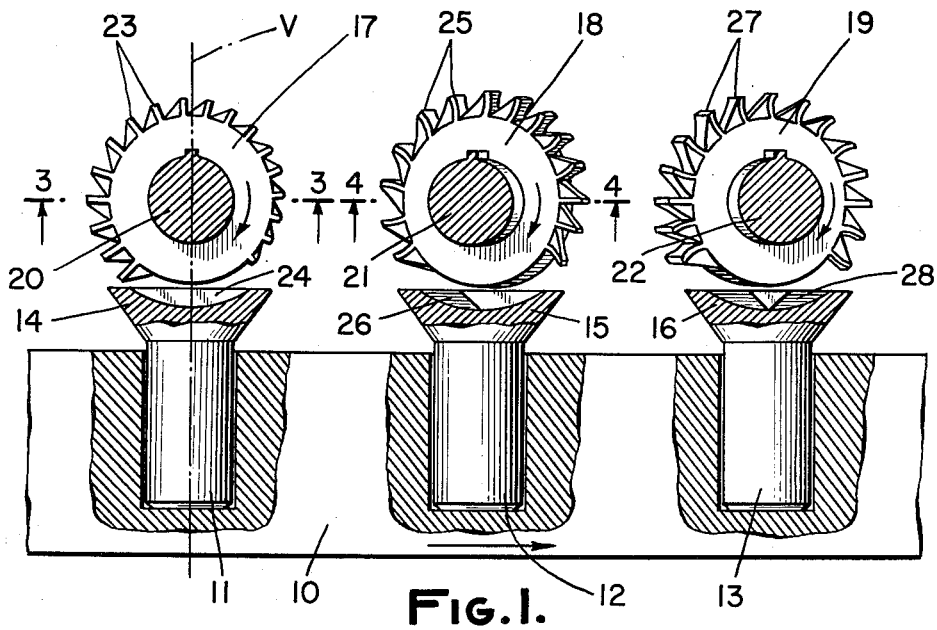
FIGURE 1 is an elevational fragmentary view partly broken away of one embodiment of the novel broaching apparatus of the present invention illustrating successive steps in forming high torque screw head slots.
Figure 2:
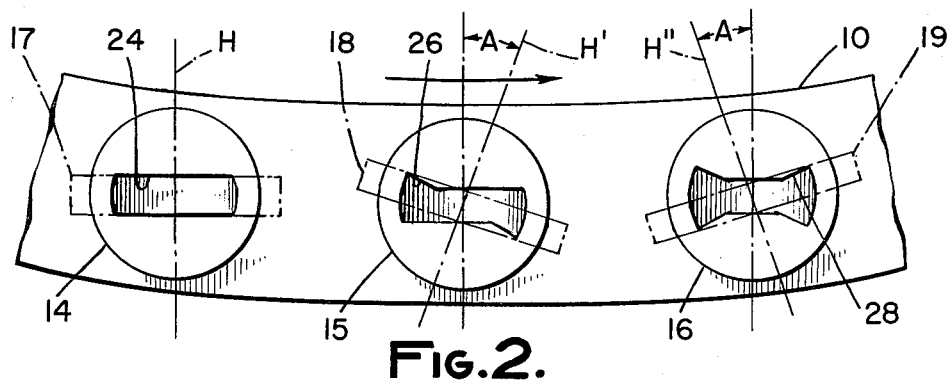
FIGURE 2 is a plan view, partly schematic, of the fragmentary structure shown in FIGURE 1.

Thus, referring to FIGURES 1 and 2 there is shown a fragmentary portion of a turn table 10 including suitable bores for supporting a plurality of screw blanks 11, 12, and 13. Each of the screw blanks includes screw heads 14, 15, and 16 positioned respectively under first, second, and third broaching wheels 17, 18, and 19 constructed in accordance with this invention. These wheels are respectively keyed to shafts 20, 21, and 22 so that rotation of the wheels may take place about first, second and third horizontal axes H, H', and H" as shown in FIGURE 2 generally normal to the longitudinal or vertical axes of the screws such as indicated by the letter V for the screw blank 11 in FIGURE 1.

The first broaching wheel 17 is provided with peripheral teeth 23 successively spaced about the periphery of the wheel to an extent less than 360 degrees having an increasing depth from a zero value to a value corresponding to the desired contemplated depth of the screw head slot. The portion of the wheel 17 lacking teeth represents a segment of the wheel under which the screw may be positioned without interfering with the teeth when the wheel is in a given initial position. Thus, as shown in FIGURE 1, the first screw blank 11 is positioned under the broaching wheel 17. The shaft 20 is fixed against any translational movement so that a fixed relationship between the axis of rotation of the wheel and the screw head 14 itself is maintained. The initial or first positioning of the screw head 14 is such that the broaching teeth 23 on the wheel 17 of minimum depth will initially engage the surface of the screw head.

With the foregoing arrangement, a single rotation of the wheel 17 in a clockwise direction as indicated by the arrow will effect a gradual broaching of a slot in the screw head to the desired depth as represented by the maximum depth of the last teeth of the wheel to engage the work.

Thus, an initial transverse slot 24 is provided after the wheel 17 has been rotated through one revolution.

The broaching wheel 18 in turn is fixed in a second position and includes peripheral teeth 25 having an increased peripheral width about the circumference of the wheel for a distance less than 360 degrees to similarly leave a segmented portion free of any teeth. The horizontal axis of rotation H' for the wheel 18, however, is disposed at an acute angle A with respect to the horizontal axis H for the wheel 17 as shown in FIGURE 2. Therefore when the screw head 14 assumes the second position occupied by the screw head 15, it will be evident that a single rotation of the broaching wheel 18 will effect a desired undercutting of one side of the slot 24 as indicated at 26. The teeth themselves have converging sides in an inward radial direction so that the desired undercut formation is realized. A diametrically opposite side to side 26 will simultaneously be cut by the wheel 18 with only a single revolution in a clockwise direction.

The third broaching wheel 19 is also fixed in a third position and includes a plurality of teeth 27 which are identical in construction to the teeth 25 for the wheel 18. The axis H" of the wheel 19 however forms the angle A with the first horizontal axis for the wheel 17 which is opposite to that formed by the horizontal axis H' of the wheel 18, so that the desired undercut of the diametrically remaining sides of the slot are provided as indicated at 28 on the screw head 16. The angle A is about 5°.

In the method as described, a plurality of screws are successively indexed to positions under the various wheels by the conveyor table 10 to effect the three steps of the broaching operation. Those screws passing from the last broaching wheel 19 are thus provided with high torque slots having the desired undercut non-planar sidewalls.

Figure 3:
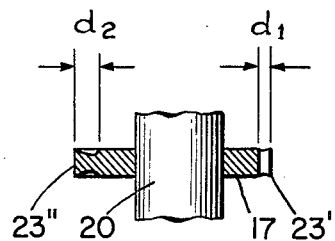
FIGURE 3 is a cross section of one of the broaching wheels of FIGURE 1 taken in the direction of the arrows 3—3; and, FIGURE 4 is another cross section similar to FIGURE 3 of a second broaching wheel shown in FIGURE 1 taken generally in the direction of the arrows 4—4.

FIGURE 3 illustrates the varying radial depth of the teeth 23 for the wheel 17 wherein it will be noted that the particular tooth 23' is of a much less radial depth as indicated at $d$, than the tooth 23" on the opposite side of the wheel, as indicated at $d_2$.

Figure 4:
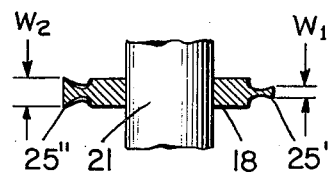

FIGURE 4 on the other hand illustrates the varying width of the teeth for the wheel 18 wherein it will be noted that the particular tooth 25' on one side of the wheel has a width $w_1$ and the particular tooth 25" on the opposite side of the wheel has a larger width $w_2$. In FIGURE 4, the converging feature of the sidewalls of the respective teeth in an inward radial direction is evident so that the desired undercut surfaces of revolution are provided.

From the foregoing description of the method and apparatus of this invention with respect to the formation of high torque slotted screw heads, it will be evident that the final interior dimensions of the slot will correspond to those of the largest dimensioned tooth on the various broaching wheels. Thus, extremely close tolerances can be achieved. Moreover, it will be evident that there is not required any raising or lowering of the broaching tool or any swivelling of the tool axis as characterized the former method for forming the screw slots with a cutting wheel.

In the various drawings, the angle A has been exaggerated for clarity. In actual practice the undercut in each side of the screw slot is only of the order of 15 mils. For the particular broaching operation as described it is thus possible to form the screw head slot with only two broaching wheels each including teeth that both vary in depth and width and disposed respectively at the angles of the wheels 18 and 19. The slot itself is thus cut simultaneously with the formation of the under cuts and the wheel 17 is eliminated.

In instances wherein the under cut is deeper or in which other shaped slots are to be formed, additional broaching wheels may be provided progressively set at uniformly increasing angles so that progressive broaching is achieved, each wheel removing only a given amount of material and the last wheel determining the final geometry of the slot or formation.

Thus, while the present invention has been described in detail with respect to one method of forming slots in screw heads, it will be evident that the principles thereof are extendable to the formation of any type of work in any desired manner. Various modifications and changes such as suggested above which clearly fall within the scope and spirit of this invention will thus occur to those skilled in the art. Therefore, the novel broaching method and apparatus as set forth are not to be thought of as limited to the one particular operation described.

What is claimed is:

1. A broaching apparatus for forming undercut slots in screw heads comprising, in combination: a conveyor means for successively conveying said screw heads with their longitudinal axes extending in vertical directions to first, second, and third successive positions; a first broaching wheel mounted for rotation about a first horizontal axis adjacent to said first position, said first broaching wheel having peripheral broaching teeth of depth increasing about the periphery of said wheel from zero to a value equal to the desired depth of said slots; a second broaching wheel mounted for rotation about a second horizontal axis adjacent to said second position, said second broaching wheel having broaching teeth of width at their periphery successively increasing about the periphery of said wheel from a value less than the width of said slots to a value equal to the width of said slots added to the desired undercut on each side of said slots, the sides of said teeth converging in a radial inward direction from said periphery, said second horizontal axis forming an acute angle with said first horizontal axis; and a third broaching wheel mounted for rotation about a third horizontal axis adjacent to said third position, said third broaching wheel having broaching teeth identical to the broaching teeth of said second wheel, said third horizontal axis forming an acute angle equal to said first-mentioned angle with the opposite side of said first horizontal axis, the broaching teeth on each of said wheels extending circumferentially for a distance less than 360 degrees to leave a segmented portion free of any teeth, said wheels being rotationally positioned so that said segmented portions are above and spaced out of engagement with said screw heads.

2. A broaching method of forming an undercut slot in a screw head, comprising the steps of: passing said screw head under a first broaching wheel having peripheral broaching teeth of depth varying from zero to a value equal to the desired depth of said slot, the positioning of said wheel being such that the teeth of least depth are initially in contact with said screw head; effecting one rotation of said first wheel about a first horizontal axis normal to the longitudinal axis of said screw head to broach said slot into said head by progressively deeper cutting of said teeth; moving said screw head to a position under a second broaching wheel having broaching teeth of width at their periphery varying from a value less than the width of said slot to a value equal to the width of said slot added to the width of the desired undercut on each side of said slot, the sides of said teeth converging in a radially inward direction from said periphery, said second broaching wheel being mounted for rotation about a second horizontal axis normal to said longitudinal axis and forming an acute angle with said first horizontal axis, the positioning of said second wheel being such that the least width teeth initially engage the side of said slot; effecting one rotation of said second wheel to broach under-cut portions by progressive cutting action of said wider teeth on each of said two sides diametrically opposite to each other with respect to said longitudinal axis; moving said screw head to a position under a third broaching wheel, identical to said second broaching wheel, mounted for rotation about a third horizontal axis normal to said longitudinal axis and forming an acute angle with the opposite side of said first horizontal axis equal to said first mentioned acute angle; and effecting one rotation of said third wheel to broach under-cut portions on the remaining diametrically opposite two sides of said slot in a manner similar to said last mentioned broaching, to complete said under-cut slot in said screw head.

3. The method of claim 2, in which said acute angle is about 5°.

4. A broaching method of forming an under-cut in a cavity in a work comprising the steps of: positioning said cavity under a broaching wheel having broaching teeth progressively increasing in width at their periphery, the sides of said teeth converging in a radially inward direction from said periphery, said positioning being such that the least width teeth initially engage a side surface of said cavity; and rotating said wheel while holding said wheel against translation so that a progressive cutting action against said side surface as the successively wider teeth cut into said side surface takes place to produce said under cut by broaching.

References Cited in the file of this patent

UNITED STATES PATENTS

| | | |
|---|---|---|
| 1,610,087 | Hanson | Dec. 7, 1926 |
| 2,013,899 | Roco | Sept. 10, 1935 |
| 2,616,104 | Boulton | Nov. 4, 1952 |
| 2,745,120 | Vaughn | May 15, 1956 |